(12) United States Patent
Rogunova et al.

(10) Patent No.: US 7,855,251 B2
(45) Date of Patent: Dec. 21, 2010

(54) IMPACT-MODIFIED POLYAMIDE COMPOUNDS

(75) Inventors: Marina Rogunova, Pittsburgh, PA (US); Ying Liang, Vernon Hills, IL (US)

(73) Assignees: PolyOne Corporation, Avon Lake, OH (US); AMCOL International Corporation, Arlington Heights, IL (US)

( * ) Notice: Subject to any disclaimer, the term of this patent is extended or adjusted under 35 U.S.C. 154(b) by 866 days.

(21) Appl. No.: 11/575,782

(22) PCT Filed: Sep. 22, 2005

(86) PCT No.: PCT/US2005/033945

§ 371 (c)(1),
(2), (4) Date: Mar. 22, 2007

(87) PCT Pub. No.: WO2006/034388

PCT Pub. Date: Mar. 30, 2006

(65) Prior Publication Data

US 2008/0021138 A1    Jan. 24, 2008

Related U.S. Application Data

(60) Provisional application No. 60/612,376, filed on Sep. 23, 2004.

(51) Int. Cl.
  C08L 77/02 (2006.01)
  C08L 77/06 (2006.01)
  C08L 53/00 (2006.01)
(52) U.S. Cl. ................................ 525/92 B; 525/94
(58) Field of Classification Search ............... 525/94, 525/92 B
See application file for complete search history.

(56) References Cited

U.S. PATENT DOCUMENTS

| | | | |
|---|---|---|---|
| 4,472,538 A | 9/1984 | Kamigaito et al. | |
| 4,739,007 A | 4/1988 | Okada et al. | |
| 5,719,233 A | 2/1998 | Gallucci et al. | |
| 6,124,365 A | 9/2000 | Lan et al. | |
| 6,242,500 B1 | 6/2001 | Lan et al. | |
| 6,262,162 B1 | 7/2001 | Lan et al. | |
| 6,399,690 B2 | 6/2002 | Lan et al. | |
| 6,906,127 B2 | 6/2005 | Liang et al. | |
| 2002/0042474 A1 | 4/2002 | Court et al. | |
| 2003/0109629 A1 | 6/2003 | Pierre et al. | |
| 2006/0116475 A1* | 6/2006 | Leibler et al. | ............. 525/92 B |
| 2007/0054982 A1 | 3/2007 | Banerjie et al. | |
| 2007/0066743 A1 | 3/2007 | Rogunova et al. | |
| 2007/0185265 A1 | 8/2007 | Rogunova et al. | |

FOREIGN PATENT DOCUMENTS

| | | |
|---|---|---|
| DE | 4235302 A1 | 10/1992 |
| EP | 1207172 A2 | 5/2002 |
| FR | 2820138 A1 | 8/2002 |
| FR | 2849855 A1 * | 7/2004 |
| JP | 09217012 A * | 8/1997 |
| JP | 2001049059 A | 2/2001 |
| JP | 2004217698 A | 8/2004 |
| KR | 20030068854 A | 8/2003 |
| WO | 9929772 A1 | 6/1999 |
| WO | WO9941060 | 8/1999 |
| WO | 03106562 A1 | 6/2003 |

OTHER PUBLICATIONS

JP 09217012 A, Oyamada et al., Aug. 1997, English Ab.*
http://www.arkema.com/pdf/En/products/technical_polymers/lotader/4700.pdf, Jul. 2005.*
Gervat et al., "SBM block copolymers, or the power of nanostructuration" ANTEC 2003, pp. 2772-2776.
Bonnet et al., "A new class of epoxy thermosets" ANTEC 2003, pp. 823-826.
Gervat et al., "New alloying possibilities with SBM block copolymers" ANTEC 2003, pp. 2318-2322.
Patent Abstracts of Japan for JP2004217698, Aug. 5, 2004.
Patent Abstracts of Japan for JP2001049059, Feb. 20, 2001.
Korean Intellectual Property Office Abstract for KR20030068854, Aug. 25, 2003.

* cited by examiner

Primary Examiner—Satya B Sastri
(74) Attorney, Agent, or Firm—John H. Hornickel; Richard H. Anderson

(57) ABSTRACT

A tri-block copolymer is disclosed for use as an impact modifier in polyamide compounds also containing a compatibilizer, preferably also having reinforcing organoclay exfoliated and dispersed therein. The tri-block copolymer comprises an aromatic monomer, an olefin monomer, and a alkyl (meth)acrylate monomer.

19 Claims, No Drawings

IMPACT-MODIFIED POLYAMIDE COMPOUNDS

CLAIM OF PRIORITY

This application claims priority from U.S. Provisional Patent Application Ser. No. 60/612,376 filed on Sep. 23, 2004 and also from U.S. Provisional Patent Application Ser. No. 60/689,770 filed on Jun. 10, 2005.

FIELD OF THE INVENTION

This invention relates to toughened polyamide-based compounds with balanced properties, such as high stiffness, ductility, chemical resistance and low specific gravity.

BACKGROUND OF THE INVENTION

Impact modification of polymers is well known. For example, European Patent Publication EP1207172A2 discloses an improved impact modifier for blends of polyester with other polymers, including polycarbonate, wherein the impact modifier itself is a compound of a core/shell additive and a linear copolymer of olefin, alkyl acrylate, and glycidyl methacrylate monomers.

Reinforcement of polymers with organoclays (also known as intercalated nanoclays) is also well-known, for example, using organic polymers, such as polyamide, and exfoliated layered silicate are well known. These composites are generally prepared by (1) melt blending process of treated a montmorillonite clay with polyamide under shear mixing conditions sufficient to allow the intercalated clay layers uniformly dispersed within the polymer matrix or (2) in-situ polymerization (U.S. Pat. No. 4,472,538) of caprolactam in the presence of the treated nanoclay. Nylon nanocomposites containing exfoliated clay generally exhibit enhanced strength characteristics, such as flexural modulus, heat distortion temperature and tensile strength. However, while addition of the clay improves stiffness, it is also reduces already poor impact strength of nylon.

SUMMARY OF THE INVENTION

What is needed is impact modification for polyamide and compounds containing polyamide. It is also desirable to incorporate an impact modifier in such polyamide compounds, whenever a combination of high impact and high stiffness is necessary, e.g. industrial parts such as external vehicle components, thin wall applications. Preferably, the polyamide-based compound also contains organoclay particles for reinforcement.

There is a need to produce polyamide-based compounds which have good impact properties, smooth surface finishes, weatherability, scratch resistance, solvent resistance, and a balance of flexural modulus, heat distortion temperature, and impact properties.

The present invention provides use of a new impact modifier that enhances impact properties throughout service temperatures for polyamides, compound without compromising heat distortion temperature or flexural modulus properties. The new impact modifier is a triblock copolymer of a hard-soft-hard configuration, which permits it to respond to both low and high temperature conditions with good impact properties.

The new impact modifier is used, in combination with a compatibilizer selected from (a) thermoplastic elastomers such as Kraton brand styrene/ethylene-butylene/styrene triblock copolymers; or (b) Lotader MAH brand terpolymers based on random ethylene/acrylic ester/maleic anhydride terpolymers produced by high pressure polymerization process, or (c) combinations thereof.

One aspect of the present invention is a polyamide compound, comprising (a) a polyamide; (b) a tri-block copolymer of an aromatic monomer, an olefin monomer, and an alkyl (meth)acrylate monomer; and (c) a compatibilizer selected from the group consisting of thermoplastic elastomers, such as Kraton brand styrene/ethylene-butylene/styrene triblock copolymers; Lotader MAH brand terpolymers based on random ethylene/acrylic ester/maleic anhydride terpolymers, and combinations thereof.

Another aspect of the present invention is a polyamide compound, comprising (a) a polyamide; (b) a tri-block copolymer of an aromatic monomer, an olefin monomer, and an alkyl(meth)acrylate monomer; (c) a compatibilizer selected from the group consisting of thermoplastic elastomers, maleic anhydride terpolymers, and combinations thereof; and (d) organoclay particles.

One feature of the compounds of the present invention is good impact properties at service temperatures without compromising other physical properties otherwise present, e.g., flexural modulus, tensile strength, and heat distortion temperature.

An advantage of the compounds of the present invention is that a single compound can be used as parts for a machine that requires service temperatures ranging from about −40° C. to 70° C., even though certain parts have different temperature requirements within that range. For example, in an exterior automotive application, the same part can function predictably notwithstanding its use in Alaska in the winter and Arizona in the summer. Moreover, a part designed to be adjacent a heat source can function even in a very cold environment, for example, a snow blower engine housing.

Another advantage of the compounds of the present invention is that the compound can be pigmented according to design choice of the manufacturer with an excellent surface finish.

Other features and advantages will be revealed in the discussion of the embodiments below.

EMBODIMENTS OF THE INVENTION

Thermoplastic Polymers to be Impact Modified

The thermoplastic polymers can be one or a number of polyamides, (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines.

Non-limiting examples of polyamides homopolymers and copolymers are polycaprolactam (nylon 6), poly(hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and the like.

Polyamide resin suitable for practice of the present invention may be used singly; as a blends of two or more aliphatic polyamides; in combination with resins containing nitrogen, oxygen, halogen, sulfur or other groups capable of interacting with an aromatic functional groups such as halogen or acidic groups. The polyamide resin may also be blended with one or more suitable thermoplastic resins.

Suitable thermoplastic resins include resins selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

The amount of thermoplastic polymer in the compound can range from about 50 to about 95, and preferably from about 60 to about 80 weight percent of the compound.

Triblock Copolymer Impact Modifier

Departing from the prior art, the compounds of the present invention contain a new impact modifier, tri-block copolymers constructed of three linear chains covalently bonded to one another. The three blocks are an aromatic monomer, an olefin monomer, and an alkyl(meth)acrylate monomer.

As presently known, the only commercially available tri-block copolymers useful as impact modifiers use styrene.

The relative contribution of the aromatic monomer to the tri-block copolymer ranges from about 20 to about 55, and preferably from about 33 to about 46 weight percent of the copolymer.

Non-limiting examples of the olefin monomer are alkyl monomers having four carbon atoms: butylene, and butadiene. Butadiene is preferred because of its low glass transition temperature (−85° C.), its heat stability, and its better affinity with fillers such as carbon black.

The relative contribution of the olefin monomer to the tri-block copolymer ranges from about 7 to about 40, and preferably from about 14 to about 33 weight percent.

Non-limiting examples of the alkyl(meth)acrylate monomer include tert-butylmethacrylate and methylmethacrylate, with mostly syndiotactic methylmethacrylate being preferred due to a high glass transition temperature (135° C.), better miscibility with some polymers such as PC and PVC, and increased heat stability.

The relative contribution of the alkyl(meth)acrylate monomer to the tri-block copolymer ranges from about 20 to about 55, and preferably from about 20 to about 33 weight percent.

Such tri-block copolymers are commercially available such as the styrene-butadiene-methylmethacrylate family of products commercially available as "SBM" from Arkema Chemicals, Inc. of Philadelphia, Pa. Additional information about these tri-block copolymers can be found in PCT Patent Publication WO99/29772, in which they are identified as ABC block copolymers.

Such tri-block copolymer impact modifier can be included in the compound of the present invention in an amount from about 3 to about 25, and preferably from about 5 to about 20 weight percent of the compound. Most preferably, the amount is about 5 to about 15 weight percent of the compound.

Not being limited to a particular theory, one advantage of using SBM tri-block copolymer as an impact modifier is that the copolymer imposes a structuralization in the polymer matrix with formation of core-shell type of particles.

Blended with compatible polymers, SBM tri-block copolymer imposes a nanostructuralization to compatible thermoplastic matrixes yielding a combination such properties as high impact strength, rigidity and elevated HDT. Because none of the blocks of the SBM tri-block copolymer are compatible with polyamide, addition of suitable reactive compatibilizer is important to achieve high performance.

Compatibilizer

The compatibilizer of the present invention is selected from the group consisting of thermoplastic elastomers, maleic anhydride terpolymers, and combinations thereof. The thermoplastic elastomer can be a rubber-modified graft copolymer, such as a styrenic block copolymer.

Styrenic block copolymers are well known as having a styrenic end blocks and olefinic midblocks. The combination of styrenic and olefinic blocks provides a non-crosslinked thermoplastic elastomer polymer. Commercially available styrenic block copolymers are Kraton brand copolymers from Kraton Company. Among the commercial offerings are Kraton G, Kraton D, Kraton FG, and Kraton A copolymers. Preferably, Kraton FG 1901X brand styrene/ethylene-butene-1/styrene triblock copolymer rubber modified with maleic anhydride copolymer can be used.

Alternatively or additionally, a terpolymer of olefinic monomer, acrylate monomer, and maleic anhydride can be used as the compatibilizer. Preferably, Lotader MAH brand random ethylene/acrylic ester/maleic anhydride terpolymers from Arkema can be used. These terpolymers are produced by a high pressure polymerization process.

The compatibilizer can be included in the compound of the present invention in an amount from about 1 to about 20, and preferably from about 5 to about 18 weight percent of the compound.

Optional Organoclay

Organoclay is obtained from nanoclay. Nanoclay is a clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix, such as a polyamide. An intercalant is an organic or semi-organic chemical capable of entering the montmorillonite clay gallery and bonding to the surface. Exfoliation describes a dispersion of an organoclay (surface treated nanoclay) in a plastic matrix.

In exfoliated form, nanoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the organoclay and the plastic matrix. In polymer compounding, a nanocomposite is a very convenient means of delivery of the nanoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites.

Nanocomposites offer flame-retardancy properties because such nanocomposite formulations burn at a noticeably reduced burning rate and a hard char forms on the surface. They also exhibit minimum dripping and fire sparkling.

In the present invention, preferably, the impact modified polyamide compound has organoclay (intercalated nanoclay) added to the polyamide matrix, preferably during the polymerization of polyamide from caprolactam, such that the polymer compound of the present invention is termed an intumescent polyamide nanocomposite with polyamide serving as the exfoliant of the organoclay. Particularly preferred organoclays are I24P, I30P, and I44P from Nanocor, Inc.

Table 1 shows ranges of acceptable, desirable, and preferred weight percents of the various ingredients of the impact-modified, polyamide compound of the present invention, relative to the total weight of the compound, all being expressed in approximate values. Because the organoclay is optional, the low end of each range is zero.

TABLE 1

Weight Percent of Resin Ingredients to Total Compound

| Polymer | Acceptable (Wt. %) | Desirable (Wt. %) | Preferred (Wt. %) |
| --- | --- | --- | --- |
| Polyamide | 50-95 | 60-80 | 70-80 |
| Triblock Copolymer Impact Modifier | 3-25 | 5-20 | 5-15 |
| Compatibilizer | 1-20 | 2.5-18 | 2.5-18 |
| Organoclay (Optional) | 0-9 | 0-8 | 0-8 |

Optional Linear Terpolymer Impact Modifier

This optional impact modifier comprises a linear terpolymer of (a) ethylene, (b) a lower alkyl acrylate and (c) a monomer which contains a heterocycle containing one oxygen atom as the hetero-atom.

"Lower alkyl acrylate" means a $C_1$-$C_8$ and preferably a $C_1$-$C_4$ alkyl ester of (meth)acrylic acid. Of these possibilities, methyl acrylate is preferred.

Preferably the heterocyclic monomer contains an epoxy atom.

Relative amounts of monomer in the terpolymer range from 55-75 weight percent ethylene, 20-30 weight percent lower alkyl acrylate, and 5-15 weight percent heterocyclic monomer.

Such linear terpolymer impact modifiers are commercially available such as the ethylene-methyl acrylate-glycidyl methacrylate product commercially available as "Lotader AX 8900" from Arkema Chemicals, Inc. of Philadelphia, Pa.

Such linear terpolymer impact modifier can be included in the compound of the present invention in an amount from 0 to about 10, and preferably from 0 to about 7. Most preferably, the amount is about 1 to about 5 percent by weight of the compound.

All of the impact modifiers can be in powder, flake, or pellet form. They can be compounded together into a concentrate or mixed with the thermoplastic polymers during melt processing in preparation for direct molding or pelletization for later molding.

Optional Additives

As with many thermoplastic compounds, it is optional and desirable to include other additives to improve processing or performance. Such optional additives can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants, preferably essentially halogen-free; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Such optional additives can be included in the compound of the present invention in an amount from 0 to about 40, and preferably from 0.1 to about 30 weight percent. Most preferably, the amount is about 1 to about 7 weight percent of the compound.

Method of Processing Compounds

The compound of the present invention can be prepared by melt reactive extrusion process, which makes it possible to vary such extrusion parameters as temperature profile, screw design, output rate, rpm, etc to achieve homogeneous dispersion of the impact modifier on the scale less than 1 micrometer.

Preferably, when organoclay is also present, in-situ polymerization procedure of caprolactam (cyclic compounds represented, which undergo ring-opening polymerization to form polyamides), is used to intercalate the nanoclay with polyamide polymerized from caprolactam, according to the teachings of U.S. Pat. No. 4,739,007.

The triblock copolymer impact modifier with compatibilizer can be added by melt reactive extrusion process.

Mixing of caprolactam with the treated nanoclay can be achieved by two different methods.

In the "wet" method, caprolactam can be dissolved in water preheated up to 90° C., and then Nanomer I.24TL powder from Nanocor, Inc. can be incorporated in a separate tank to the mixture of molten caprolactam and 3-4 wt % of water in a nitrogen atmosphere. The mixture can then be introduced to the reaction tank. Polymerization is typically carried out at 275° C. for 6-9 hours under the pressure of 5-6 bar.

In the dry method, I.24TL powder is pre-blended with dry caprolactam powder. The mixture obtained in the mixing step may be immediately heated to cause polymerization. The mixer should be capable of mixing speeds ranging from about 50 to about 1000 rpm. The temperature profile from the mixer should range from about 170° C. to about 280° C., and preferably from about 220° C. to about 275° C., depending on the ingredients.

The powder mixture can then be added to the reactor for polymerization. The final step is to polymerize the mixture obtained in the mixing step above by heating it to a prescribed temperature, thereby giving an intended compound of this invention. Ring opening polymerization can be carried out in the temperature range from 200° C. 300° C., preferably between 250° C. and 300° C., and most preferably at 250° C. for rapid progress of polymerization. Suitable polymerization time, though different depending on the level of clay and polymerization temperature, is preferably in the range from 5 to 24 hours. To be more specific, polymerization at 250° C. can be put to completion in about four hours when an 5% of organic nanoclay is used as swelling agent, but it requires 8 to 12 hours for completion when an 8% clay was incorporated. The resultant mixture consisted of PA-6/Nanoclay with 8-9% residual caprolactam. Residual caprolactam was washed with water at 100° C. for 24 hours. Nano-nylon was dried in vacuum for 30 hours at 115° C.

Compounds of the present invention can be made by either method. Products made were PA-6 nanocomposite with 5 weight percent of organoclay (Nanocor I.24TL powder) using both wet and dry methods, and with 8 weight percent I.24TL using the dry method.

After polymerization of polyamide in the presence of organoclay final PA-6/nanoclay composite (Nano-Nylon) can be compounded with SBM triblock-copolymer as impact modifier and SEBS-MAH or Lotader 3410 as compatibilizer using ZSK 25 Twin Screw extruder. The composite materials obtained according to the procedure detailed above may be directly injection-molded or extruded into finish articles, or may be mixed with polyamides or other types of polymers before molding.

As an example, extrusion can be carried out in a suitable extruder, such as a Werner-Pfleiderer 25 mm co-rotating twin screw extruder. The extruder should be capable of screw speeds ranging from about 50 to about 12000 rpm. The temperature profile from the barrel number two to the die should range from about 200° C. to about 280° C., and preferably from about 210° C. to about 270° C., depending on the ingredients of the melt.

The extrudate can be pelletized or directed into a profile die. If pelletized, the pellets can then be molded by injection, compression, or blow molding techniques known to those skilled in the art.

Usefulness of the Invention

Impact-modified polyamide compounds of the present invention are useful for transportation-related molded items (e.g., crash helmets and parts for vehicles such as bumpers and fenders); electrical equipment when flame retardants or reinforcing fillers are also added (e.g., plugs, connectors, boxes, and switches); and consumer appliance housings and containers (e.g., kitchen appliance housings and shells, and consumer electronics housings and cases).

Further embodiments of the invention are described in the following Examples.

EXAMPLES

Test Methods

Table 2 shows the test methods used in conjunction with the evaluation of the examples.

TABLE 2

| Test Name | Test Method |
|---|---|
| Tensile Strength | ASTM D638 |
| Flexural Modulus | ASTM D790 |
| Notched Izod Impact Strength | ASTM D256 |
| % Elongation at Break | ASTM D638 Rigid |

Compound Ingredients and Order of Addition

Table 3 shows the ingredients of Examples 1 and 2 and Comparative Examples A and B. Table 4 shows the amount of ingredients added to a Werner-Pfleiderer ZSK-25 co-rotating twin-screw extruder operating at 270° C. (T-melt) and 500 rpm speed. The extrudate was pelletized and subsequently injection molded into the various required test forms on a Nissei injection molding machine operating at 250° C. (T-melt).

TABLE 3

| Trade Name | Source | Generic Description |
|---|---|---|
| Rodalon | Italy | Nylon 6 |
| Kraton FG 1901X | Kraton Polymers | SEBS block-copolymer functionalized with MAH |
| Kraton G 1657 | Kraton Polymers | SEBS block-copolymer |
| Nanonylon 5/2 | PolyOne Polibasa | 5 wt. % nanoclay in Nylon 6 |
| Nanonylon 3 | PolyOne Polibasa | 3 wt. % nanoclay in Nylon 6 |
| Lotader 3410 | Arkema Chemicals | Linear Terpolymer Impact Modifier (E-MA-MAH) |
| Lotader 1336 | Arkema Chemicals | Linear Terpolymer Impact Modifier (E-MA-MAH) |
| Ultranox 626 | Crompton | Diphosphite stabilizer |
| AC 540 | Honeywell | Polyethylene wax |
| SBM 223 | Arkema Chemicals | Triblock Copolymer Impact Modifier (styrene-butadiene-methylmethacrylate) |
| SBM 004 | Arkema Chemicals | Triblock Copolymer Impact Modifier (styrene-butadiene-methylmethacrylate) |
| Naugard XL1 | Crompton | 2,2'-Oxamido bis-[ethyl-3-(3,5-di-t-butyl-4-hydroxyphenyl) prop antioxidant |
| Naugard 445 | Crompton | 4,4'-Bis(alpha,alpha-dimethylbenzyl) diphenylamine antioxidant thermal stabilizer |

TABLE 4

| Raw Materials in Weight Percent | Comparative Example A (Nylon 6 Control) | Example 1 | Comparative Example B (Nylon 6 Control) | Example 2 |
|---|---|---|---|---|
| Nylon 6 | 100 | 79 | | |
| Nano-Nylon 5/2 | | | 100 | 75 |
| SBM 004 | | 10 | | 15 |
| Kraton FG 1901X | | 10 | | 4 |
| Kraton 1657 | | | | 6 |
| Naugard XL1 | | 0.4 | | 0.4 |
| Naugard 445 | | 0.4 | | 0.4 |
| Ultranox 626 | | 0.2 | | 0.2 |

Results

Table 5 shows the experimental results.

TABLE 5

| Test | Comp. Example A | Example 1 | Comp. Example B | Example 2 |
|---|---|---|---|---|
| Stress at Break (psi) | 11,700 | 9,084 | 13,900 | |
| Flexural Modulus (psi × 1000) | 390 | 290 | 700 | 357 |
| Average Impact (ft*lb/in) @ 23° C. | 1 | 26 | 0.5 | 13.5 |
| Elongation Strain at Break (%) | 40 | 244 | 2.3 | |

Table 4 shows that use of impact modifier comprising a tri-block copolymer of an aromatic monomer, an olefin monomer, and an alkyl (meth)acrylate monomer greatly improves toughness, as measured by Notched Izod Impact, without adversely affecting stiffness, as measured by Flexural Modulus. Indeed, a 25% reduction in stiffness for polyamide is incidental compared with a 26,000% increase in toughness for that polyamide also containing impact modifier. Also, an extremely brittle nanoclay filled polyamide (at 700,000 psi Flexural Modulus) has toughness increase by 27,000% with a 49% reduction in stiffness. By plotting toughness vs. stiffness (x axis vs. y axis), one can see that Examples 1 and 2 result in extremely stiff and tough engineered polymeric materials.

Table 6 shows the ingredients and experimental results for Examples 3-7, which concern a study of impact modifier and compatibilizer for 3% nanoclay-filled nylon.

TABLE 6

|  | Ex. 3 | Ex. 4 | Ex. 5 | Ex 6 | Ex. 7 |
|---|---|---|---|---|---|
| Ingredients |  |  |  |  |  |
| Nanonylon 3 | 80 | 80 | 80 | 80 | 80 |
| Lotader 1336 | 14.94 | 12.23 | 1 | 1 | 4 |
| Kraton 1901x | 4.06 | 6.77 | 12.48 | 10.8 | 1 |
| SBM004 | 1.01 | 1 | 6.52 | 8.2 | 15 |
| Results |  |  |  |  |  |
| Flex. Modulus, kpsi | 395 | 383 | 392 | 398 | 398 |
| Impact Strength, ft lb/in | 15.5 | 20.6 | 20.1 | 19.1 | 2.7 |

Table 7 shows the ingredients and experimental results for Examples 8-19, which concern a study of impact modifier and compatibilizer for 5% nanoclay-filled nylon. Optionally, one can add 0.4 parts per 100 parts of the ingredients of Table 7 (phr) of Naugard XL1 antioxidant, 0.4 phr of AC 540 wax, 0.4 phr of Naugard 445 stabilizer, and 0.2 phr Ultranox 626 stabilizer to provide additional durability performance (stabilizer and antioxidant) and processing ease (wax).

TABLE 7

|  | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| Ingredients |  |  |  |  |  |  |  |  |  |  |  |  |
| Nanonylon 5/2 | 80 | 80 | 80 | 80 | 80 | 80 | 80 | 80 | 80 | 80 | 80 | 80 |
| SBM 004 | 15 | 1 | 3.34 | 1 | 5.66 | 6.84 | 10.34 | 8.00 | 15.00 | 8.00 | 1.00 | 3.34 |
| Kraton 1901 | 4 | 18 | 6.33 | 4 | 8.67 | 6.33 | 6.33 | 11.00 | 4.00 | 4.00 | 11.00 | 13.33 |
| Lotader XX1336 | 1 | 1 | 10.33 | 15 | 5.67 | 6.83 | 3.33 | 1.00 | 1.00 | 8.00 | 8.00 | 3.33 |
| Results |  |  |  |  |  |  |  |  |  |  |  |  |
| Flex Modulus, kpsi | 443 | 447 | 453 | 472 | 443 | 441 | 445 | 434 | 441 | 455 | 436 | 448 |
| Impact Strength, ft lb/in | 2.4 | 6.5 | 12.2 | 2.3 | 14.4 | 3.9 | 3.7 | 15.3 | 2.8 | 2.4 | 18.2 | 10.6 |

The invention is not limited to the above embodiments. The claims follow.

What is claimed is:

1. A polyamide compound, comprising:
   (a) a polyamide;
   (b) from about 3 to about 25% by wt. of the compound of a tri-block copolymer of an aromatic monomer, an olefin monomer, and an alkyl(meth)acrylate monomer;
   (c) a compatibilizer selected from the group consisting of thermoplastic elastomers, terpolymers containing maleic anhydride, and combinations thereof; and
   (d) from about 1 to about 5% by wt. of the compound of a linear terpolymer of (a) ethylene, (b) a lower alkyl acrylate and (c) a monomer which contains a heterocycle containing one oxygen atom.

2. The polyamide compound of claim 1, further comprising organoclay.

3. The polyamide compound of claim 1, wherein the polyamide comprises polycaprolactam, poly(hexamethylene adipamide), poly(hexamethylene sebacamide), poly(11-aminondecanoic acid), poly(12-aminododecanoic acid), or mixtures thereof alone or blended with resins containing nitrogen, oxygen, halogen, sulfur or other groups capable of interacting with an aromatic functional group or one or more thermoplastic resins selected from the group consisting of polyolefins, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones and mixtures thereof.

4. The polyamide compound of claim 1, wherein the tri-block copolymer comprises from about 20 to about 50 weight percent of aromatic monomer, from about 7 to about 40 weight percent of olefin monomer, and from about 20 to about 55 weight percent of alkyl(meth)acrylate, and wherein the tri-block copolymer is included in the compound in an amount from 3 to about 25 weight percent of the polyamide compound.

5. The polyamide compound of claim 4, wherein the compatibilizer comprises styrene/ethylene-butene-1/styrene tri-block copolymer rubber modified with maleic anhydride copolymer or terpolymer of olefinic monomer, acrylate monomer, and maleic anhydride, or combinations thereof, and wherein the thermoplastic elastomer is included in the compound in an amount from about 1 to about 20 weight percent of the polyamide compound.

6. The polyamide compound of claim 5, further comprising organoclay, wherein the organoclay is included in the compound in an amount from 0 to about 9 weight percent of the polyamide compound.

7. The polyamide compound of claim 1, further comprising optional additives comprising adhesion promoters; biocides, anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; or combinations of them.

8. An article made from the polyamide compound of claim 1, wherein the article is selected from the group consisting of a transportation-related molded item, electrical equipment, and a consumer appliance housing or container.

9. A polyamide compound, comprising:
   (a) a polyamide;
   (b) from about 3 to about 25% by wt. of the compound of a tri-block copolymer of an aromatic monomer, an olefin monomer, and an alkyl(meth)acrylate monomer;
   (c) a thermoplastic elastomer; and
   (d) from about 1 to about 5% by wt. of the compound of a linear terpolymer of (a) ethylene, (b) a lower alkyl acrylate and (c) a monomer which contains a heterocycle containing one oxygen atom.

10. The polyamide compound of claim 9, further comprising organoclay.

11. The polyamide compound of claim 9, wherein the polyamide comprises polycaprolactam, poly(hexamethylene adipamide), poly(hexamethylene sebacamide), poly(11-aminondecanoic acid), poly(12-aminododecanoic acid), or mixtures thereof alone or blended with resins containing nitrogen, oxygen, halogen, sulfur or other groups capable of interacting with an aromatic functional group or one or more thermoplastic resins selected from the group consisting of polyolefins, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones and mixtures thereof.

12. The polyamide compound of claim 9, wherein the tri-block copolymer comprises from about 20 to about 50 weight percent of aromatic monomer, from about 7 to about 40 weight percent of olefin monomer, and from about 20 to about 55 weight percent of alkyl(meth)acrylate, and wherein the tri-block copolymer is included in the compound in an amount from 3 to about 25 weight percent of the polyamide compound.

13. The polyamide compound of claim 12, wherein the thermoplastic elastomer comprises styrene/ethylene-butene-1/styrene triblock copolymer rubber modified with maleic anhydride copolymer, and wherein the thermoplastic elastomer is included in the compound in an amount from about 1 to about 20 weight percent of the polyamide compound.

14. The polyamide compound of claim 13, further comprising organoclay, wherein the organoclay is included in the compound in an amount from 0 to about 9 weight percent of the polyamide compound.

15. The polyamide compound of claim 9, further comprising optional additives comprising adhesion promoters; biocides, anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; or combinations of them.

16. An article made from the polyamide compound of claim 9, wherein the article is selected from the group consisting of a transportation-related molded item, electrical equipment, and a consumer appliance housing or container.

17. A polyamide compound, comprising:
(a) a polyamide;
(b) a tri-block copolymer of an aromatic monomer, an olefin monomer, and an alkyl(meth)acrylate monomer;
(c) a compatibilizer selected from the group consisting of thermoplastic elastomers, terpolymers containing maleic anhydride, and combinations thereof; and
(d) a linear terpolymer of (a) ethylene, (b) a lower alkyl acrylate and (c) glycidyl methacrylate.

18. The polyamide compound of claim 17, further comprising organoclay.

19. An article made from the polyamide compound of claim 17, wherein the article is selected from the group consisting of a transportation-related molded item, electrical equipment, and a consumer appliance housing or container.

* * * * *